United States Patent
Kropp et al.

(10) Patent No.: US 7,232,264 B2
(45) Date of Patent: Jun. 19, 2007

(54) OPTOELECTRONIC ARRANGEMENT HAVING A LASER COMPONENT, AND A METHOD FOR CONTROLLING THE EMITTED WAVELENGTH OF A LASER COMPONENT

(75) Inventors: Jörg-Reinhardt Kropp, Berlin (DE); Martin Weigert, Berlin (DE)

(73) Assignee: Infineon Technologies AG, Munich (DE)

( * ) Notice: Subject to any disclaimer, the term of this patent is extended or adjusted under 35 U.S.C. 154(b) by 156 days.

(21) Appl. No.: 10/740,775

(22) Filed: Dec. 19, 2003

(65) Prior Publication Data
US 2005/0135774 A1    Jun. 23, 2005

(51) Int. Cl.
*G02B 6/36* (2006.01)
(52) U.S. Cl. .............................. 385/92; 385/88; 385/94; 385/147; 398/196
(58) Field of Classification Search ............ 385/88–94, 385/147; 398/182, 195, 196, 200, 201
See application file for complete search history.

(56) References Cited

U.S. PATENT DOCUMENTS

| | | | | |
|---|---|---|---|---|
| 6,920,161 B2* | 7/2005 | Riaziat et al. | ................. | 372/36 |
| 2005/0063649 A1* | 3/2005 | Fukuda et al. | ................. | 385/92 |
| 2005/0125177 A1* | 6/2005 | Giaretta et al. | ............... | 702/79 |

FOREIGN PATENT DOCUMENTS

WO    WO 03/069744 A1    8/2003

* cited by examiner

*Primary Examiner*—Kevin S Wood
(74) *Attorney, Agent, or Firm*—Eschweiler & Associates, LLC

(57) ABSTRACT

The invention relates to an optoelectronic arrangement having a laser component. There are provided: a cooling device of small design for cooling the laser component down to a constant temperature, a device for the direct optical detection of the emitted wavelength of the laser component, whose signal is used to control the cooling device, and a package of small design with an extent of at most 6.5 mm perpendicular to the optical axis of the laser component and in which the above named components are arranged. The invention also relates to a method for controlling the emitted wavelength of a laser component.

18 Claims, 4 Drawing Sheets

OPTOELECTRONIC ARRANGEMENT HAVING A LASER COMPONENT, AND A METHOD FOR CONTROLLING THE EMITTED WAVELENGTH OF A LASER COMPONENT

REFERENCE TO RELATED APPLICATIONS

This application is related to U.S. application Ser. No. 10/742,534 filed on Dec. 19, 2003, entitled "Optoelectronic Arrangement Having at Least One Laser Component, and a Method for Operating a Laser Component".

FIELD OF THE INVENTION

The invention relates to an optoelectronic arrangement having a laser component, and to a method for controlling the emitted wavelength of a laser component. It enables the exact setting and monitoring of the emitted wavelength of a laser component.

BACKGROUND OF THE INVENTION

For the purpose of transmitting as large a quantity of data as possible via an optical waveguide, it is known in optical telecommunications to multiplex the data to be transmitted. One possibility for this purpose is to transmit information independently and simultaneously over one waveguide with the aid of several wavelengths (wavelength division multiplexing—WDM). It is necessary in this case to keep reliably on the transmission side to the various prescribed optical wavelength channels. Thus, there is a need in the transmission modules for an optical arrangement with the aid of which the wavelength of the individual transmission devices can be monitored and, if required, corrected. The aim in this case is for the technical solution provided to be of small overall size, to require little electric power and to be capable of cost effective production.

WO 03/069744 A1 discloses an optoelectronic module in which a laser chip is arranged on a submount and is cooled by a Peltier cooler of small design. Located on the submount for the purpose of monitoring the wavelength emitted by the laser chip is a temperature sensor via which the operating temperature of the laser can be detected. The signal generated by the temperature sensor is fed to an electronic monitoring and control unit via which the temperature is set after a calibration operation on the laser and is kept stable by suitable control of the current by the Peltier cooler. A temperature is set in this case at which the laser emits the desired optical wavelength, which corresponds to a specific WDM channel.

It is also known for the emitted wavelength to be detected directly in order to monitor and control the wavelength of the light emitted by the laser. Use is made for this purpose of relatively complicated optics having one or more wavelength-dependent filters. By directly detecting the emitted wavelength of the laser component, it is possible to achieve a substantially finer stabilization of the wavelength than by exerting control through using a temperature sensor.

The Peltier cooler used in known optoelectronic arrangements for temperature stabilization are disadvantageously relatively large as a rule. Furthermore, they require a relatively large electric power and are comparatively expensive. Optoelectronic modules with wavelength stabilization are therefore cost intensive both to produce and to operate.

OBJECT OF THE INVENTION

The object of the present invention is to make available an optoelectronic arrangement having one laser component, and a method for controlling the emitted wavelength of a laser component that permits wavelength stabilization of a laser diode in a simple and cost effective way.

SUMMARY OF THE INVENTION

This object is achieved according to the invention by means of an optoelectronic arrangement that has a laser component, a cooling device for cooling the laser component down to a constant temperature, a device for the direct optical detection of the emitted wavelength of the laser component, and a package of small design with an extent of at most 6.5 mm perpendicular to the optical axis of the laser component, the above named components being arranged in the package. The signal generated by the device for the direct optical detection of the emitted wavelength of the laser component is used in this case to control the cooling device, that is to say it constitutes the controlled variable of a control loop.

The solution according to the invention is distinguished by the idea of providing an optoelectronic arrangement (micromodule) of a small size that enables the use of wavelength stabilization of lasers in so-called small form factor (SFF) transceivers and small form factor pluggable (SFP) transceivers of small design. In accordance with the SFF or SFP industry standard, the transmit path and receive path must comply with a mutual spacing of 6.5 mm at the optical plug interface.

The solution according to the invention simultaneously provides a particularly effective control of the operating point of the laser component, since a device for the direct optical detection of the emitted wavelength of the laser component is additionally integrated into the package of the optoelectronic arrangement. This device generates a signal that is fed to a control device for controlling the temperature of the laser component. The control device is usually located outside the actual optoelectronic transmission arrangement. The control device generates an actuating signal for setting the temperature of the cooling device. In this case, the operating point of the laser component is monitored by means of a direct optical detection of the wavelength. This permits a finer stabilization of the wavelength than by means of a temperature sensor, for example.

It is provided in a preferred refinement for the cooling device to be mounted directly on a solid, preferably metallic base of the package, for example by soldering. Alternatively, the cooling device can also be mounted on a separate submount. The cooling device is preferably designed as a Peltier cooler of small design (so-called micro-Peltier cooler), and with particular preference as a prefabricated micro-Peltier cooler chip. The optical micromodule is then mounted on the flat chip surface, use being made of a connecting technique that ensures good thermal conduction between the cooling device and the further component, in particular the laser component. This can be performed by soldering, for example.

The device for the direct optical detection of the emitted wavelength of the laser component preferably has a first and a second photodiode that are both irradiated with a fraction of the light emitted by the laser component. In this case, the first photodiode is provided with an optical sharp cutoff filter whose transmitted light power is continuously a function of the emitted wavelength of the laser component. Such an optical sharp cutoff filter has a first region in which the light is strongly absorbed or reflected. In a second transition region, the transmission increases continuously and substantially linearly as a rule. High transmission is obtained in a third region. The sharp cutoff filter arranged on the first laser diode is configured in such a way that the operating wavelength of the laser component is within the transmission region.

There is now detected via the first photodiode a first signal whose magnitude is a function of the emitted wavelength of the laser component. A second signal, which is proportional to the emitted light power of the laser diode, is detected via the second photodiode, which is not covered by a sharp cutoff filter. The quotient of the two signals is formed, and a wavelength from the transition region is assigned to this quotient. This information is used to control the temperature of the laser component by controlling the cooling device as appropriate. The quotient of the signal of the first and second photodiodes can here therefore be assigned a specific wavelength in each case, since the magnitude of the signal detected by the first photodiode is a function of the emitted wavelength of the laser component because of the sharp cutoff filter used. The signal detected by the second photodiode, which is proportional to the emitted light power of the laser, is, by contrast, substantially constant or has a known temperature dependence.

In a preferred refinement, the two photodiodes are arranged next to one another, and are preferably integrated in a common substrate, in particular a common photodiode chip in this case. The light from the laser component can be deflected via a deflecting mirror onto the two photodiodes. Alternatively, it can be provided that the laser component and the photodiodes are positioned relative to one another in such a way that the light from the laser component falls directly onto the photodiodes.

The photodiode not provided with the optical sharp cutoff filter preferably additionally serves as monitor diode for monitoring the light power of the laser component.

The individual components of the optoelectronic arrangement are preferably arranged in a hermetically sealed housing. Such a housing is, for example, a TO package. TO packages consist of a metallic baseplate in which the electrical connections are carried out by glass encapsulation. A cap is mounted on the baseplate and hermetically connected to the baseplate.

The laser component is preferably designed as a prefabricated laser chip with two electric connector contacts. The Peltier cooler is likewise preferably designed as a prefabricated Peltier cooler chip with two electric connector contacts.

BRIEF DESCRIPTION OF THE DRAWINGS

The invention is explained in more detail below with the aid of a number of exemplary embodiments and with reference to the figures, in which.

DESCRIPTION OF SEVERAL PREFERRED EXEMPLARY EMBODIMENTS

Figure 1A:
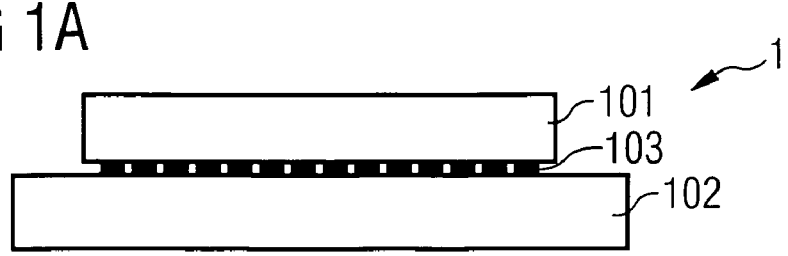
FIG. 1a shows a micro-Peltier chip in side view.
Figure 1B:
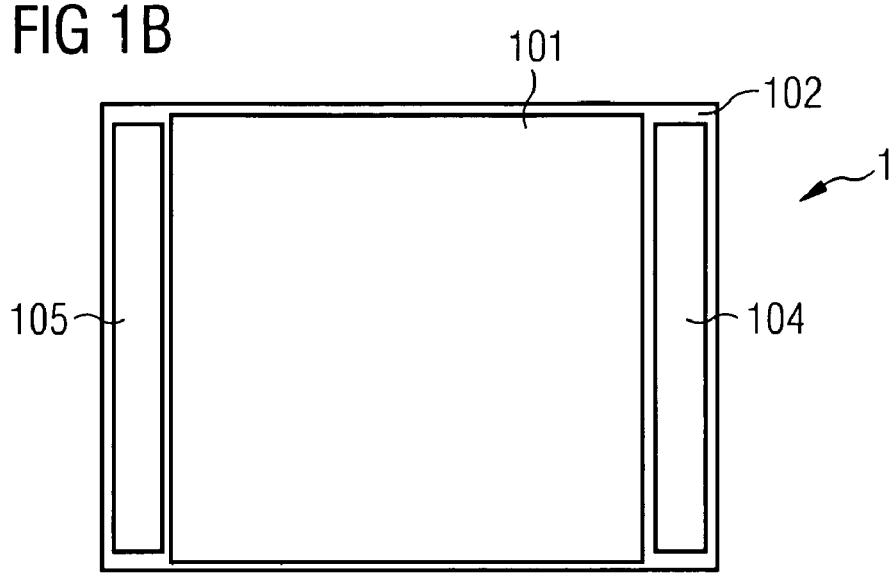
FIG. 1b shows the micro-Peltier chip of FIG. 1a in plan view.

FIGS. 1A and 1B show an exemplary embodiment of a micro-Peltier chip 1 with an edge length of preferably less than 5 mm. In particular, the micro-Peltier element illustrated preferably has a size of approximately $1.3 \times 1.3 \times 0.3$ mm$^3$ (length×width×height).

The micro-Peltier chip 1 has an upper rectangular semiconductor substrate 101 and a lower rectangular semiconductor substrate 102 that are electrically interconnected via a contacting layer 103. Two metalizations 104, 105 serving as contacts permit a voltage to be applied to the micro-Peltier chip 1. Peltier coolers utilize the Peltier effect, in accordance with which heat is extracted from or fed to the interface between two different conductors when current is flowing, depending on the direction of the current. As is known per se to the person skilled in the art, the micro-Peltier chip 1 is cooled or heated depending on the voltage applied, and so this will not be examined further.

In the present case, the micro-Peltier chip 1 is used to cool components arranged thereon, the cooling operation being set by a controller or regulator.

Figure 2:
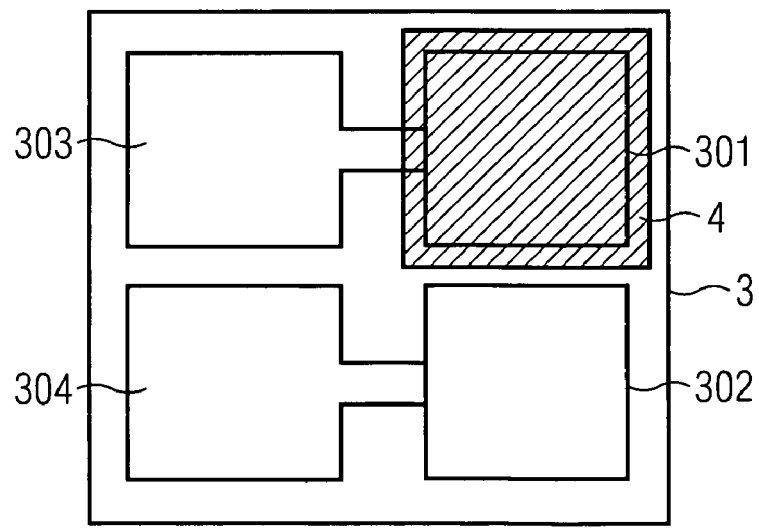
FIG. 2 shows a photodiode chip with two photodiodes arranged next to one another, one of the photodiodes being covered by a sharp cutoff filter.

FIG. 2 shows a photodiode chip 3 on which two photodiodes 301, 302 with associated contact pads 303, 304 are fitted in a neighboring fashion close to one another. The contact pads 303, 304 respectively constitute a contact for tapping a measuring signal. A common electrode is located on the underside. A double diode is present.

A sharp cutoff filter 4 is applied to the upper one of the two photodiodes 301, on the diode surface. The application is performed, for example, by vapor deposition, by sputtering dielectric layers, by epitaxial methods or else by applying a film.

Figure 3:
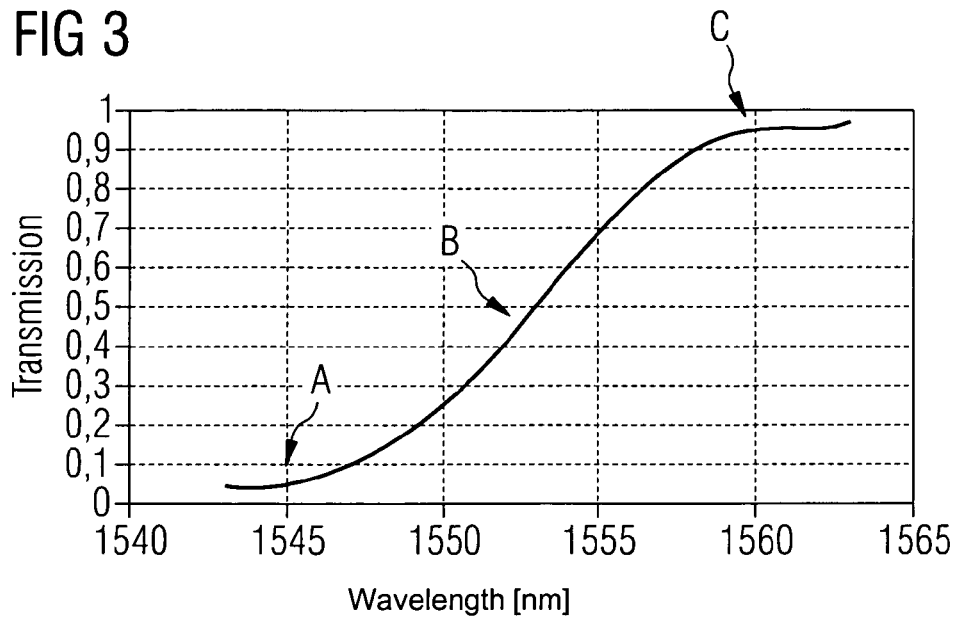
FIG. 3 shows the transmission curve of a sharp cutoff filter of a photodiode in accordance with FIG. 2.

FIG. 3 shows the transmission curve of the sharp cutoff filter 4. Accordingly, a first region A is provided in which the edge emitter strongly absorbs or reflects the light. In a third region C, by contrast, there is a very high transmission. In a transition region B, which runs substantially linearly, lying therebetween, the transmission is increased continuously as a function of the wavelength. In the photodiode chip of FIG. 2, the sharp cut-off filter 4 is configured in such a way that the operating wavelength of a laser light to be detected is situated within the transition region B. It follows directly from this that the quotient of the two signals of the two photodiodes 301, 302 can respectively be assigned a wavelength in the transition region B. The wavelength of a laser diode to be monitored can be directly detected in this way by means of the double diode 301, 302.

FIG. 3 shows a sharp cutoff filter in which the linear transition region B is approximately between 1545 and 1560 nm. It may be pointed out that this region is to be understood only by way of example. However, a preferred refinement consists in the use of an edge-emitting laser diode that emits light of a wavelength of approximately 1550 nm.

Figure 4:
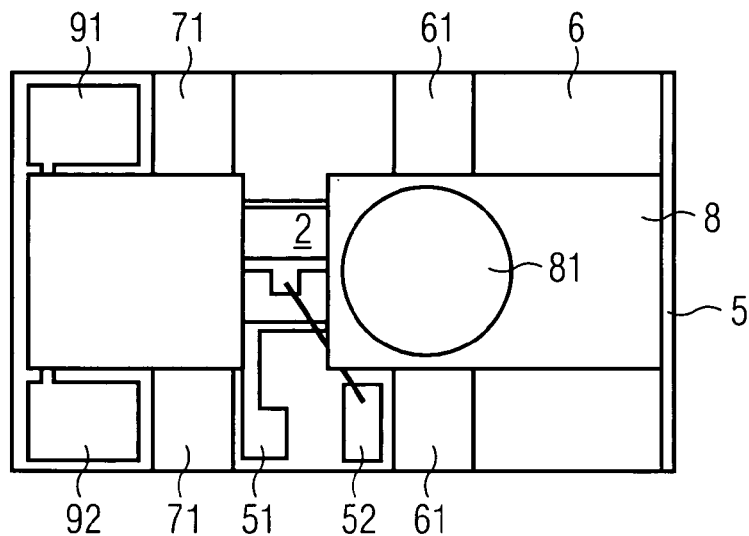
FIG. 4 shows a plan view of an optoelectronic micromodule.
Figure 5:
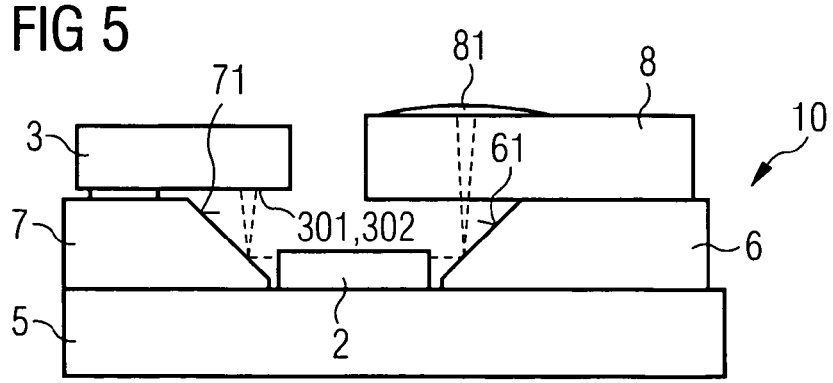
FIG. 5 shows the micromodule of FIG. 4 in side view.

FIGS. 4 and 5 show an optoelectronic micromodule 10 in which an edge-emitting laser diode is arranged on a submount 5. Arranged to the side of the laser diode 2 are two deflecting devices 6, 7 with obliquely running mirror surfaces 61, 71. On the top side of the left-hand deflecting device 7, the photodiode chip 3 of FIG. 2 is arranged with the top side downward. Located on the top side of the right-hand deflecting device 6 is a carrier element 8 that is transparent to the wavelength of the light emitted by the laser diode 2 and has a light-focusing lens 81 which is integrated or mounted.

FIG. 4 shows the micromodule of FIG. 5 in plan view, the individual contact pads for the electric connection of bonding wires being illustrated. Contact pads 91, 92 on the top side of the left-hand deflecting device 7 enable contact to be made with the contact pads 303, 304 of the double diode. Contact pads 51, 52 serve to make contact with the laser diode 2.

The mode of operation of the micromodule 10 is such that the light respectively emitted from the front and rear facets of the laser diode 2 is deflected upward by 90° by the deflecting mirrors 61, 71 of the deflecting devices 6, 7. The photodiode chip 3 with the double diode is applied to (for example soldered or bonded with the aid of a conductive adhesive) the left-hand deflecting device 7 with the top side downward in such a way that the radiation emerging from the left-hand laser facet in a widening fashion strikes the two photodiodes 301, 302. After reflection at the deflecting mirror 61, the light emerging from the right-hand laser facet penetrates the carrier element 8, and is focused by the lens 81. The focal point of the imaging of the lens 81 lies outside the TO package.

The two photodiodes 301, 302 of the photodiode chip 3 in this case serve the purpose of monitoring the light power and of the direct optical detection of the wavelength emitted by the laser diode chip 2. Thus, one photodiode 302 serves as monitor diode whose signal is fed to a monitoring device for controlling the laser power. The other photodiode 301, covered by the sharp cutoff filter, detects a signal that, as explained, is a function of the emitted wavelength of the laser diode chip 2. The current wavelength of the laser diode 2 can be determined via the quotient of the two signals of the photodiodes 301, 302. This information is then fed for the purpose of controlling the temperature of the laser component to a controlling device which controls a cooling device such that the temperature of the laser diode is stable, and consequently the wavelength of the light emitted by the laser diode 2 is constant.

Figure 6:
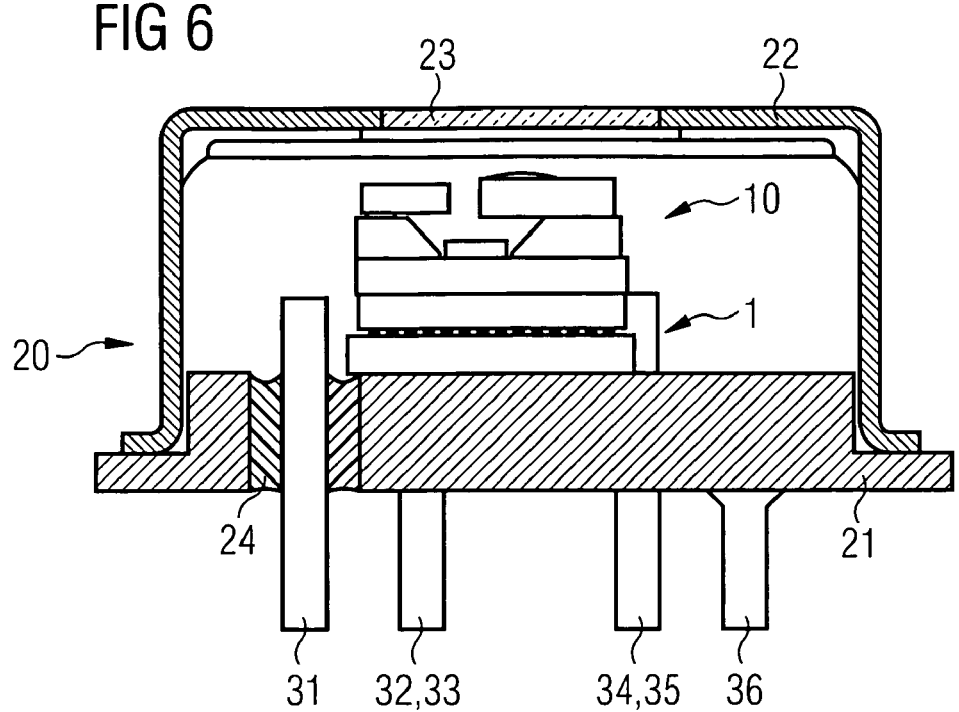
FIG. 6 shows a partially sectioned view of the micromodule of FIGS. 4 and 5, arranged in a TO package, on a micro-Peltier chip in accordance with FIGS. 1a, 1b.

FIG. 6 shows the micromodule of FIGS. 4 and 5 together with the micro-Peltier chip 1 in a TO package 20 that is known per se and has a metallic baseplate 21 on which the micro-Peltier chip 1 is arranged directly, for example by soldering. The micromodule 10 is arranged on the top side of the micro-Peltier chip 1. A metallic cap 22 with a light exit window 23 is mounted on the baseplate 21 and welded to the latter such that there is a hermetic encapsulation. Contact is made via connecting pins 31 to 36, of which the connecting pins 31 to 35 are guided through the baseplate 21 by means of insulating glass encapsulations 24. A further connecting pin 36 is electrically connected to the baseplate 21 and provides a ground connection.

Figure 7:
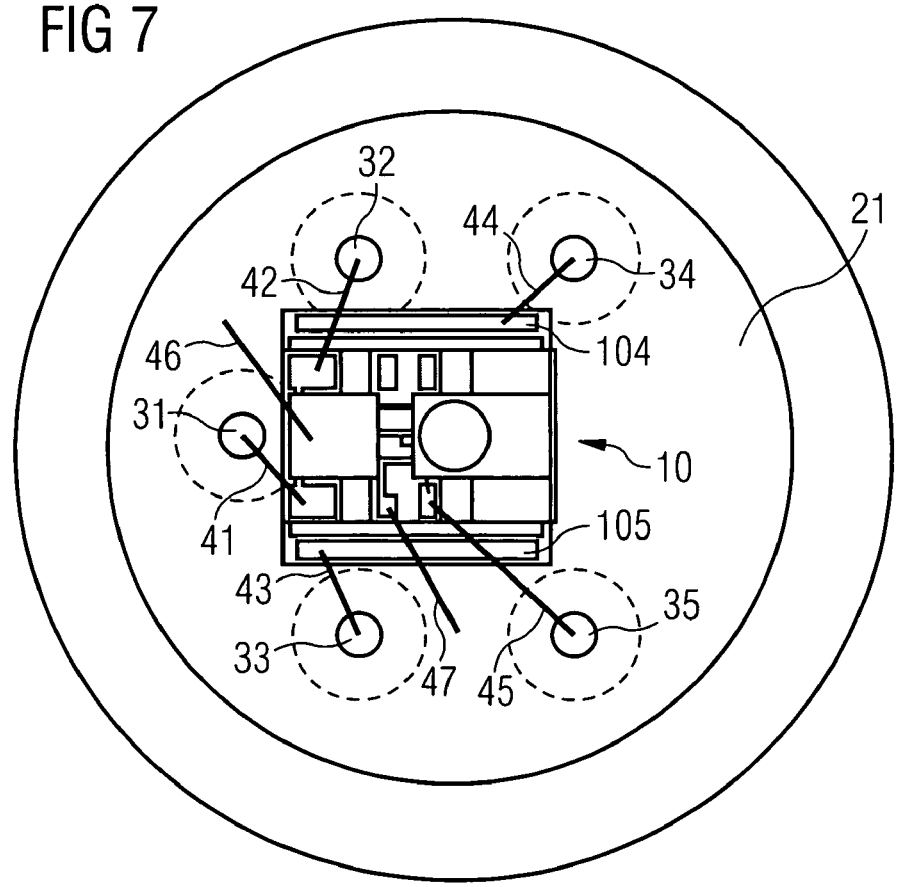
FIG. 7 shows a plan view of the arrangement in accordance with FIG. 6.

FIG. 7 shows the way electrical contact is made with the individual components of the micromodule 10 of FIGS. 4 and 5 by means of the contact pins 31 to 36. The micromodule 10 in this case has contact pads 51, 52, 91, 92 in accordance with the illustration of FIG. 4, and so reference is also made in supplement to FIG. 4.

The contact pins 31, 32 ensure contact is made with the two photodiodes 301, 302 of the photodiode chip 3 via bonding wires 41, 42. The common backside contact of the photodiode chip is connected via a bonding wire 46 to the baseplate 21, and thus to ground. Contact is made with the two contact pads 104, 105 of the micro-Peltier chip 1 via the contact pins 33, 34 and bonding pads 43, 44. A contact pad on the top side of the laser diode 2 is connected to the contact pin 35 via the contact pad 52 of the submount 5 and a bonding wire 45. The underside of the laser diode 2 is connected to the baseplate 21, and thereby to ground, via the contact pad 51 and a bonding wire 47.

The configuration of FIGS. 6 and 7 makes available a compact optoelectronic transmission arrangement that has a laser chip 2 cooled via the micro-Peltier chip 1, and in this case integrates a device for the direct optical detection of the wavelength of the laser chip without the need for a separate temperature sensor. The direct optical detection of the wavelength of the laser chip enables a very exact monitoring of the emitted wavelength. A space-saving, clean and stable system is provided by fitting the components in a hermetically sealed, small package.

Figure 8:
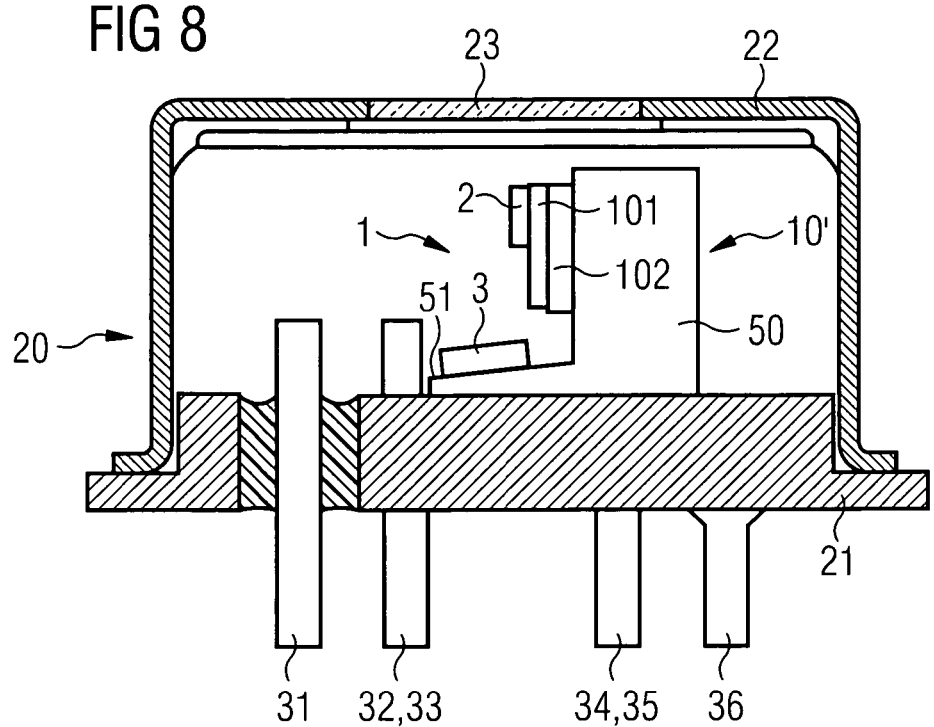
FIG. 8 shows a partially sectioned view of an alternative configuration of a micromodule, with a micro-Peltier chip, arranged in a TO package.
Figure 9:
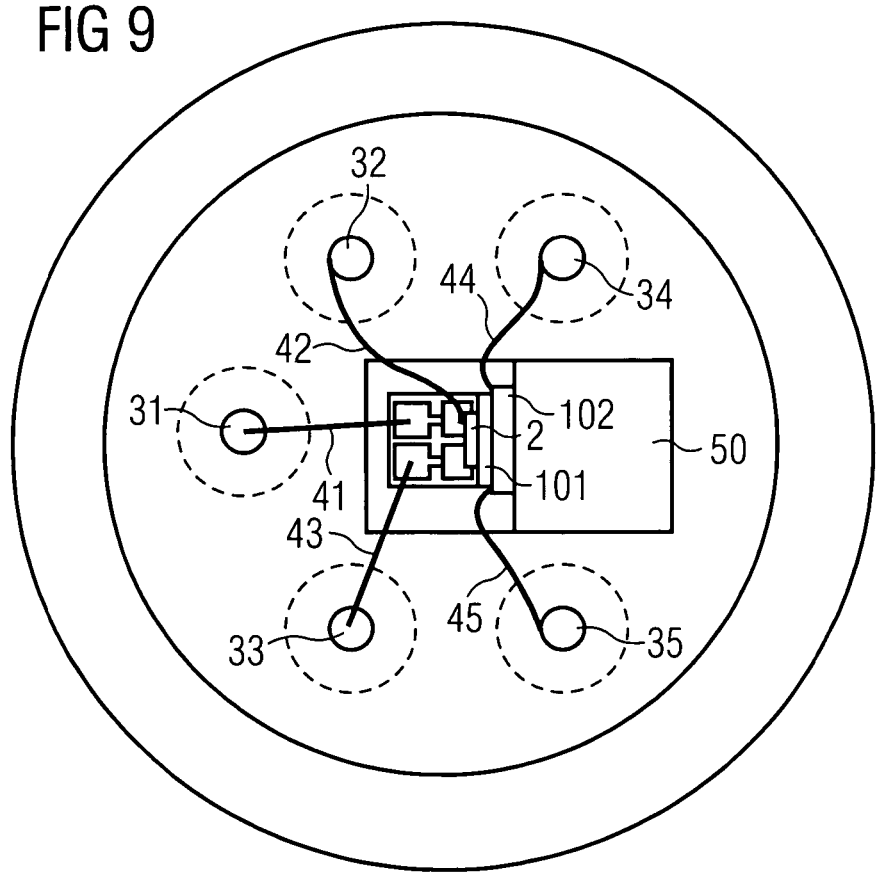
FIG. 9 shows a plan view of the arrangement of FIG. 8.

FIGS. 8 and 9 illustrate an alternative configuration of a micromodule 10' in a TO package. Once again, a cooled edge-emitting laser chip 2 is provided. However, by contrast with the preceding exemplary embodiment said chip is fastened in a vertical alignment on a fastening block 50. The laser diode 2 is arranged directly on a micro-Peltier chip 1. Alternatively, it is also possible to arrange the laser diode 2 on a submount that is then arranged on the micro-Peltier chip 1.

A photodiode chip 3 with two photodiodes 301, 302 in accordance with FIG. 2 is located on an oblique supporting surface 51 of the fastening block 50 such that the two chips 2, 3 are arranged relative to one another at an angle of somewhat greater than 90°. An arrangement at an angle of 90° or a somewhat smaller angle would likewise be possible. The light emitted from the lower facet of the laser diode 2 falls directly onto the two photodiodes 301, 302 of the photodiode chip 3. The light emitted from the upper facet is emitted from the window 23 of the TO package 20 without the need for a deflecting device.

In accordance with FIG. 9, contact is again made with the individual components via the individual connecting pins 31 to 36 and corresponding bonding wires 41 to 45. The two contact pins 31, 33 in this case make contact directly with the contact pads 303, 304 of the photodiode chip 3 via bonding wires 41, 43 (compare FIG. 2). The two contact pins 34, 35 serve to make contact with the micro-Peltier chip 1. The contact pin 32 serves to make contact with the laser diode 2. The ground contacts, which are connected to the electrically conducting baseplate 21 via bonding pads, are not illustrated in FIG. 9.

In a variant of the exemplary embodiment of FIGS. 8 and 9, the sharp cutoff filter is designed as a separate part and mounted on one of the two photodiodes. This is also possible in principle with the exemplary embodiment of FIGS. 2 to 7. However, the exemplary embodiment of FIGS. 8 and 9 enables this in a particularly simple way, since sufficient space is available above the photodiodes.

The TO package used preferably has external dimensions of at most 6.5 mm perpendicular to the optical axis of the emerging laser light such that assembly is possible in so-called small form factor (SFF) transceivers and small form factor pluggable (SFP) transceivers of small design. In accordance with the SFF or SFP industry standard, the transmit path and receive path must comply with a mutual spacing of 6.5 mm at the optical plug interface.

The invention is not restricted in its configuration to the exemplary embodiment illustrated above, which is to be understood merely by way of example. The person skilled in the art will recognize that numerous alternative variant designs exist which employ the teaching defined in the following claims despite their deviation from the exemplary embodiment described. For example, it is also possible in the case of the configuration of FIGS. 6 and 7 for the laser diode 2 to be arranged directly on a micro-Peltier chip that would then be arranged on the submount 5. The configuration of the package and the exact modular design, for example, are also to be understood merely as exemplary. Furthermore, it is also possible to use other designs of a laser diode than an edge emitter illustrated in the exemplary embodiments. In particular, the invention can likewise be used with vertically emitting laser diodes (VCSEL).

The invention claimed is:

1. An optoelectronic arrangement comprising:
a laser component,
a cooling device of small design for cooling the laser component down to a constant temperature,
a device for the direct optical detection of the emitted wavelength of the laser component, whose signal is used to control the cooling device for controlling the operating point of the laser component, and
a TO package of small design with an extent of at most 6.5 mm perpendicular to an optical axis of the TO package and in which the above named components are arranged, the TO package comprising a base plate, where the optical axis of the TO package is perpendicular to the base plate,
wherein the device for the direct optical detection of the emitted wavelength of the laser component comprises a first and a second photodiode that are both irradiated with a fraction of the light emitted by the laser component, the first photodiode having an optical sharp cutoff filter associated therewith whose transmitted light power is a function of the emitted wavelength of the laser component, and wherein means are provided for directly detecting the actual emitted wavelength of the laser component on the basis of the signals both of the first photodiode and the second photodiode.

2. The optoelectronic arrangement as claimed in claim 1, wherein the cooling device comprises a Peltier cooler.

3. The optoelectronic arrangement as claimed in claim 2, wherein the Peltier cooler has an edge length of smaller than 5 mm.

4. The optoelectronic arrangement as claimed in claim 1, further comprising a carrier substrate on which the laser component is mounted, the carrier substrate being arranged on the cooling device.

5. The optoelectronic arrangement as claimed in claim 1, wherein the two photodiodes are arranged next to one another.

6. The optoelectronic arrangement as claimed in claim 1, wherein the two photodiodes are integrated in a common photodiode chip.

7. The optoelectronic arrangement as claimed in claim 1, wherein light from the laser component is directed onto the photodiodes via a deflecting mirror.

8. The optoelectronic arrangement as claimed in claim 1, wherein the laser component and the photodiodes are positioned relative to one another in such a way that light from the laser component is directed directly onto the photodiodes.

9. The optoelectronic arrangement as claimed in claim 1, wherein the photodiode not having the optical sharp cutoff filter associated therewith additionally serves as a monitor diode for monitoring the light power of the laser component.

10. The optoelectronic arrangement as claimed in claim 1, wherein the package is of hermetically tight design.

11. The optoelectronic arrangement as claimed in claim 1, wherein the laser component comprises a laser chip with two electric connector contacts.

12. The optoelectronic arrangement as claimed in claim 2, wherein the Peltier cooler comprises a Peltier cooler chip with two electric connector contacts.

13. The optoelectronic arrangement as claimed in claim 1, where the package further comprises a cap having a light exit window opposite the base plate through which light emitted from the arrangement is emitted.

14. The optoelectronic arrangement as claimed in claim 1, where the laser component and the device for the direct optical detection are parts of a micromodule that is mounted on the cooling device, where the cooling device is mounted on the base plate of the TO package.

15. The optoelectronic arrangement as claimed in claim 1, where the laser component is an edge emitting laser that is mounted on the cooling device, where the cooling device is mounted in the TO package in an alignment perpendicular to the base plate.

16. The optoelectronic arrangement as claimed in claim 6, where the sharp cutoff filter is integrated into the common photodiode chip.

17. The optoelectronic arrangement of claim 16, where the sharp cut-off filter is configured such that the operating wavelength of the laser component falls within a transmission range of the sharp cut-off filter wherein light transmitted through the sharp cut-off filter increases substantially linearly with increases in the wavelength of the light.

18. The optoelectronic arrangement of claim 17, where the substantially linear transmission range of the sharp cut-off filter is between about 1545 and about 1560 nanometers.

* * * * *